United States Patent
Daum et al.

(10) Patent No.: US 12,399,342 B2
(45) Date of Patent: Aug. 26, 2025

(54) SYSTEMS AND METHODS FOR MOTORIZED ADJUSTMENT OF OBJECTIVE LENS CORRECTION COLLAR

(71) Applicant: FEI DEUTSCHLAND GMBH, Dreieich (DE)

(72) Inventors: Rainer Daum, Wessling (DE); Xaver Voegele, Seehausen (DE); Gerrit Pahl, Munich (DE)

(73) Assignee: FEI Deutschland GmbH (DE)

( * ) Notice: Subject to any disclaimer, the term of this patent is extended or adjusted under 35 U.S.C. 154(b) by 476 days.

(21) Appl. No.: 17/843,797

(22) Filed: Jun. 17, 2022

(65) Prior Publication Data

US 2023/0003964 A1    Jan. 5, 2023

Related U.S. Application Data

(60) Provisional application No. 63/214,591, filed on Jun. 24, 2021.

(51) Int. Cl.
G02B 7/02     (2021.01)
G02B 21/24    (2006.01)

(52) U.S. Cl.
CPC .......... *G02B 7/023* (2013.01); *G02B 21/245* (2013.01); *G02B 21/248* (2013.01)

(58) Field of Classification Search
CPC ..... G02B 7/023; G02B 21/245; G02B 21/248
USPC .................................................. 359/822–824
See application file for complete search history.

(56) References Cited

FOREIGN PATENT DOCUMENTS

WO    WO-2008100695 A2 *  8/2008  ......... G02B 27/0068

* cited by examiner

*Primary Examiner* — William Choi
(74) *Attorney, Agent, or Firm* — François A. Pelaez

(57) ABSTRACT

A system for selectively adjusting an objective lens correction collar includes a gear ring sized and shaped to fit about a correction collar of an objective lens. The system also includes an adjustment mechanism that has a motor operably connected to a complementary gear configured to selectively engage and cause movement of the gear ring, thereby adjusting the correction collar.

17 Claims, 15 Drawing Sheets

SYSTEMS AND METHODS FOR MOTORIZED ADJUSTMENT OF OBJECTIVE LENS CORRECTION COLLAR

CROSS-REFERENCE TO RELATED APPLICATIONS

This application claims the benefit of priority to U.S. Provisional Application No. 63/214,591, filed Jun. 24, 2021, entitled, "SYSTEMS AND METHODS FOR MOTORIZED ADJUSTMENT OF OBJECTIVE LENS CORRECTION COLLAR," which disclosure is herein incorporated by reference in its entirety.

BACKGROUND

Microscopy is concerned with observing small, often microscopic, objects, such as live cells. Microscope objectives include arrangements of optical elements that focus light from a sample onto an image sensor to facilitate image acquisition. Optical elements of microscope objectives are carefully selected and manufactured to balance out optical aberrations that might otherwise cause distortion and/or blurring in captured images. However, microscope objectives are often used to image samples under various conditions, which can upset the balance of the optical elements of microscope objectives. For example, different specimens, immersion media, and/or cover glass used in microscopy can cause changes in refractive index, which may introduce distortions and/or blurring into captured images. For instance, light rays coming from the periphery of the objective aperture approach the focus at a larger angle than light rays coming from the center of the objective. Thus, light rays coming from the periphery of the objective aperture experience greater refraction than light rays coming from the center of the objective. This causes spherical aberration, in the central and peripheral light rays have different focus positions. Spherical aberrations can result in lower resolution and/or lower fluorescence intensity in microscope images.

Some microscope objectives have emerged that attempt to compensate for spherical aberrations (and/or other types of aberrations) by including adjustable correction collars, which change the relative positioning of the optical elements of microscope objectives to realign the focus points of light rays (e.g., such adjustments may compensate for different substrate thicknesses and/or materials).

Some correction collars are manually operated by users. However, manual correction collars are cumbersome to operate, particularly because the amount of aberration can change with focus depth. Thus, a user may need to readjust the correction collar as the focal point moves deeper into a sample.

Some microscope objectives include automated correction collars. However, such correction collars are often bulky and include an electromechanical enclosure that surrounds the optical elements of the objective. Thus, conventional automated correction collars often transfer heat to the optical elements of the objective, which can cause focus drift that negatively affects imaging. Conventional automated correction collars also often prevent manual access to the lenses. Furthermore, under conventional approaches, each microscope objective that includes its own automated correction collar also includes its own motor, which results in inefficiency and high cost for manufacturers and consumers alike.

Accordingly, there is an ongoing need and desire for improved motorized correction collar adjustment systems for microscope objectives.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Implementations of the present disclosure extend at least to systems and methods for selectively adjusting an objective lens correction collar.

Some embodiments provide a system that includes a gear ring sized and shaped to fit about a correction collar of an objective lens. The system also includes an adjustment mechanism that has a motor operably connected to a complementary gear configured to selectively engage and cause movement of the gear ring, thereby adjusting the correction collar. Some embodiments further include a controller for operating the adjustment mechanism.

Some embodiments provide a method for motorized adjustment of an objective lens correction collar. The method includes positioning an objective lens translation device at a first position. The objective lens translation device includes an objective lens having a correction collar fitted with a gear ring. The method also includes engaging a z drive to move the objective lens across a z-distance to a correction collar adjustment position. The gear ring associates with a complementary gear of an adjustment mechanism at the correction collar adjustment position. The method also includes engaging a motor of the adjustment mechanism to adjust the correction collar.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

FIGS. 6, 7, 8, and 9 illustrate example depictions of graphical user interfaces associated with operation of a system for motorized adjustment of an objective lens correction collar.

DETAILED DESCRIPTION

Implementations of the present disclosure extend at least to systems and methods for motorized adjustment of objective lens correction collars. The disclosed embodiments may facilitate various advantages over conventional techniques for facilitating adjustment of objective lens correction collars. For example, implementations of the present disclosure provide a motor for adjusting an objective lens correction collar that that does not share an enclosure with the objective lens itself. Accordingly, techniques of the present disclosure substantially avoid significant heat transfer between the motor and the lens elements of the objective lens. Furthermore, implementations of the present disclosure provide an adjust mechanism for adjusting a correction collar that can be used to adjust multiple different objective lens correction collars, thereby facilitating gains in cost efficiency and operational efficiency over existing system. Still furthermore, by substantially eliminating the need for multiple correction collar adjustment motors in a microscope system that includes a set of multiple objective lenses, the number of wires extending toward a set of objective lenses may be reduced, thereby reducing clutter and reducing the number of points of system wear.

Attention will now be directed to FIGS. 1A through 10, which provide various supporting illustrations related to the disclosed embodiments.

Figure 1A:
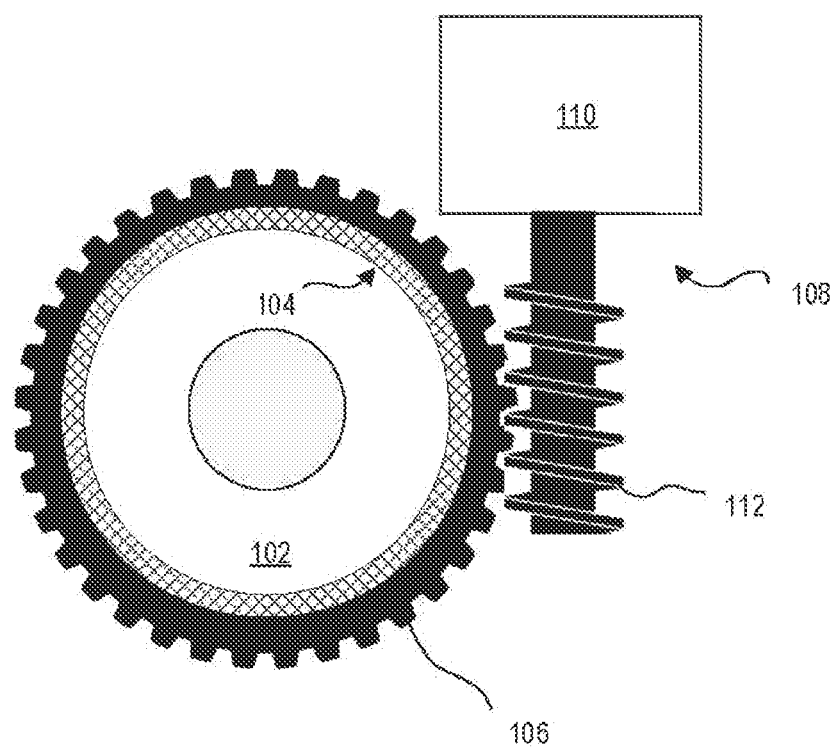
FIG. 1A illustrates a top view of example components of a system for motorized adjustment of an objective lens correction collar.

Example Systems and Techniques for Motorized Adjustment of Objective Lens Correction Collars FIG. 1A illustrates a top view of example components of a system for motorized adjustment of an objective lens correction collar. In particular, FIG. 1A illustrates an objective lens 102, which is usable to facilitate microscopy. FIG. 1A also depicts a correction collar 104 of the objective lens 102. As noted above, the correction collar 104 is adjustable (e.g., rotatable) to change the relative positioning of the optical elements of the objective lens 102. However, manual adjustment of the correction collar 104 is cumbersome and inefficient, as discussed above.

FIG. 1A illustrates a gear ring 106 affixed to the objective lens 102 about the correction collar 104 thereof. The gear ring 106 is configured to interface with an adjustment mechanism 108 to facilitate motorized and/or automated adjustment of the gear ring 106, thereby motorizing and/or automating adjustment of the correction collar 104 about which the gear ring 106 is fit. The adjustment mechanism 108 of the example of FIG. 1A comprises a motor that is operably connected to a worm gear 112 that complements the teeth of the gear ring 106. When the worm gear 112 is moved into engagement with the gear ring 106 (or when the objective lens 102 with the gear ring 106 is moved into engagement with the worm gear 112), the motor 110 may rotate the worm gear 112, thereby causing rotation of the gear ring 106 and the correction collar 104.

Although the worm gear 112 of FIG. 1A is depicted as a non-enveloping worm gear (e.g., with a slope of 2 mm/revolution), other types and/or configurations of worm gears may be utilized in accordance with the present disclosure (e.g., globoid worm gears). Indeed, although the adjustment mechanism 108 of the example shown in FIG. 1A comprises a worm drive that includes the worm gear 112, other types of adjustment mechanisms that include elements that complement the gear ring 106 may be utilized in accordance with the present disclosure. For example, an adjustment mechanism for rotating a gear ring 106 may comprise an intermeshing gear that forms a gear train with the gear ring 106 when the intermeshing gear is moved into engagement with the gear ring 106. For example, the intermeshing gear may comprise teeth that are sized, shaped, and angled to mate with teeth of the gear ring 106 to form an interlocking fit. When engaged, the intermeshing gear may rotate in the same plane as the gear ring 106.

Figure 1B:
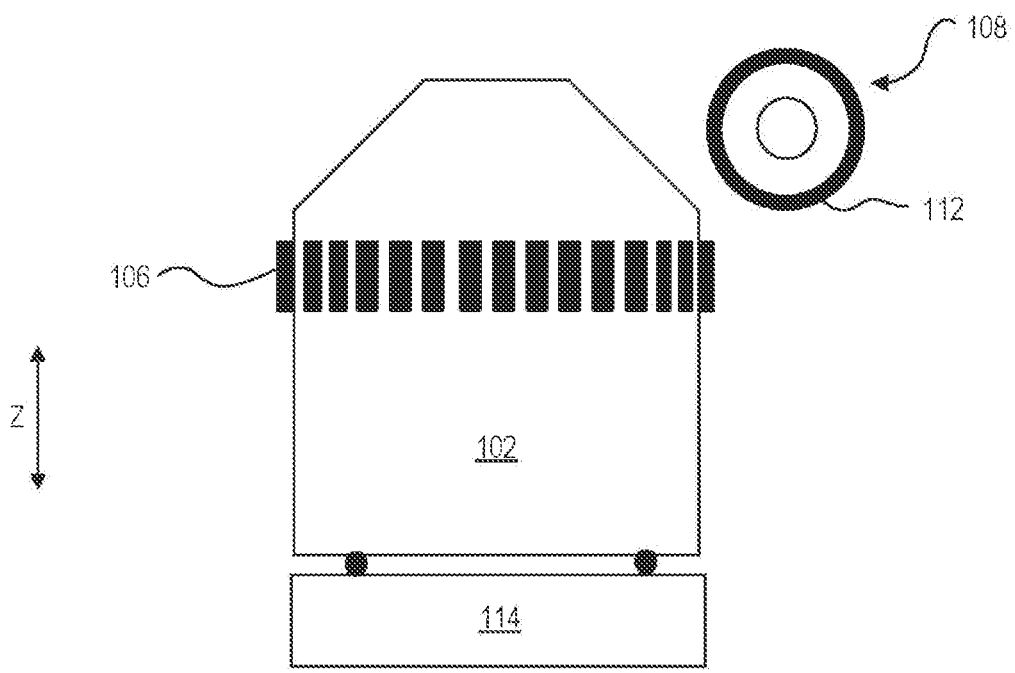
FIGS. 1B and 1C illustrate side views of an example of moving a gear ring into engagement with a complementary gear of an adjustment mechanism.
Figure 1C:
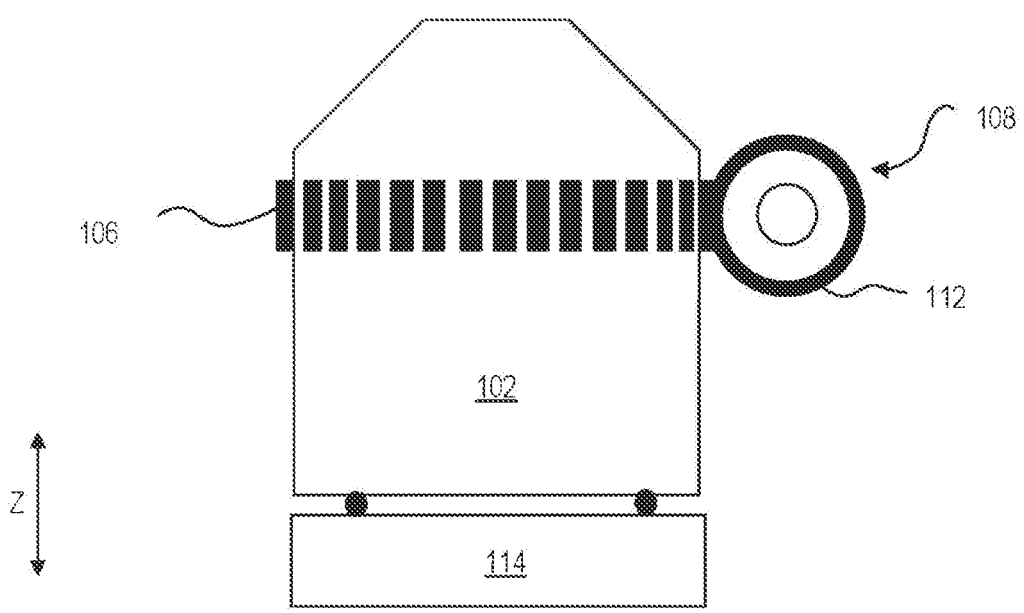

FIGS. 1B and 1C illustrate side views of an example of moving a gear ring into engagement with a complementary gear of an adjustment mechanism. In particular, FIG. 1B illustrates the worm gear 112 of the adjustment mechanism 108 at a fixed position relative to the gear ring 106 of the objective lens 102. FIG. 1B illustrates the gear ring 106 of the objective lens 102 at a first position vertically offset from the worm gear 112 (e.g., by a "z" distance, as indicated in FIGS. 1B and 1C via the "z" axis), such that the gear ring 106 is not rotatable via actuation of the worm gear 112 while the gear ring 106 and the objective lens 102 are in the first position.

FIG. 1B illustrates a Z drive 114, which may comprise any component configured to translate an objective lens 102 (e.g., a Z drive for moving individual lenses of an objective lens slider or objective lens turret). The Z drive 114 is operable to move the objective lens 102 in the z direction into a correction collar adjustment position, wherein the gear ring 106 engages the worm gear 112 such that actuation of the worm gear 112 causes rotation of the gear ring 106 and associated correction collar of the objective lens 102 (as shown in FIG. 1C).

Figure 1D:
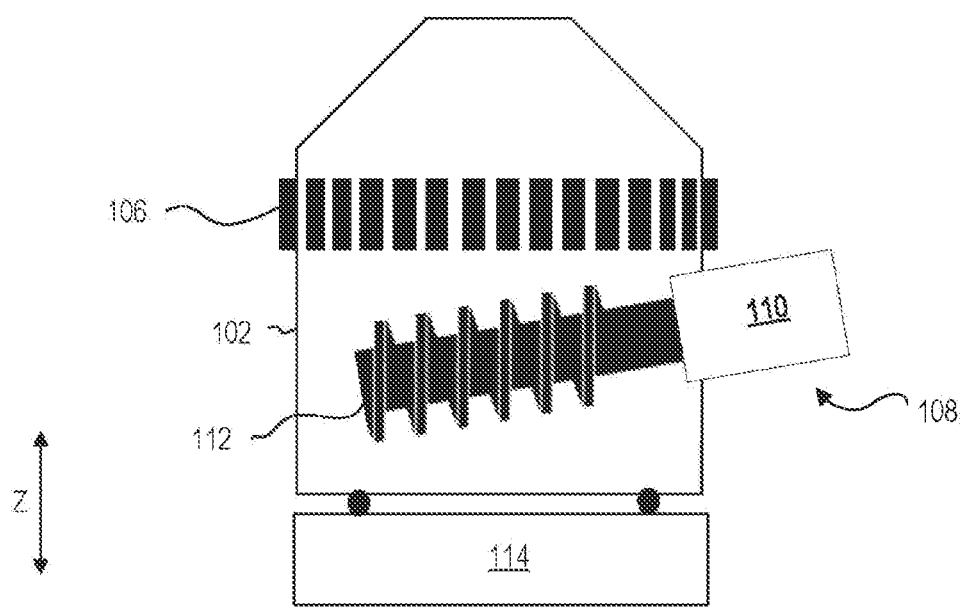
FIG. 1D illustrates a side view of an arrangement of a complementary gear and a gear ring.

FIG. 1D illustrates that, in some implementations, the worm gear 112 of the adjustment mechanism 108 is arranged (e.g., tilted or rotated by the slope of the worm thread) such that the gear teeth of the worm gear 112 and the gear teeth of the gear ring 106 are parallel to one another, which may allow for easier engagement of the worm gear 112 with the gear ring 106.

The functionality demonstrated in FIGS. 1A-1D allows the adjustment mechanism 108 to adjust the correction collar of the objective lens 102 in a manner that substantially avoids significant heat transfer between the motor of the adjustment mechanism 108 and the optical elements of the objective lens 102. For example, the motor 110 of the adjustment mechanism 108 is not within the same enclosure as the optical elements of the objective lens 102. Instead, the motor 110 actuates a worm gear (or other gear) that interfaces with a gear ring 106 on an exterior of the objective lens 102, thereby providing a less significant thermal path between the motor 110 and the objective lens.

Figure 2A:
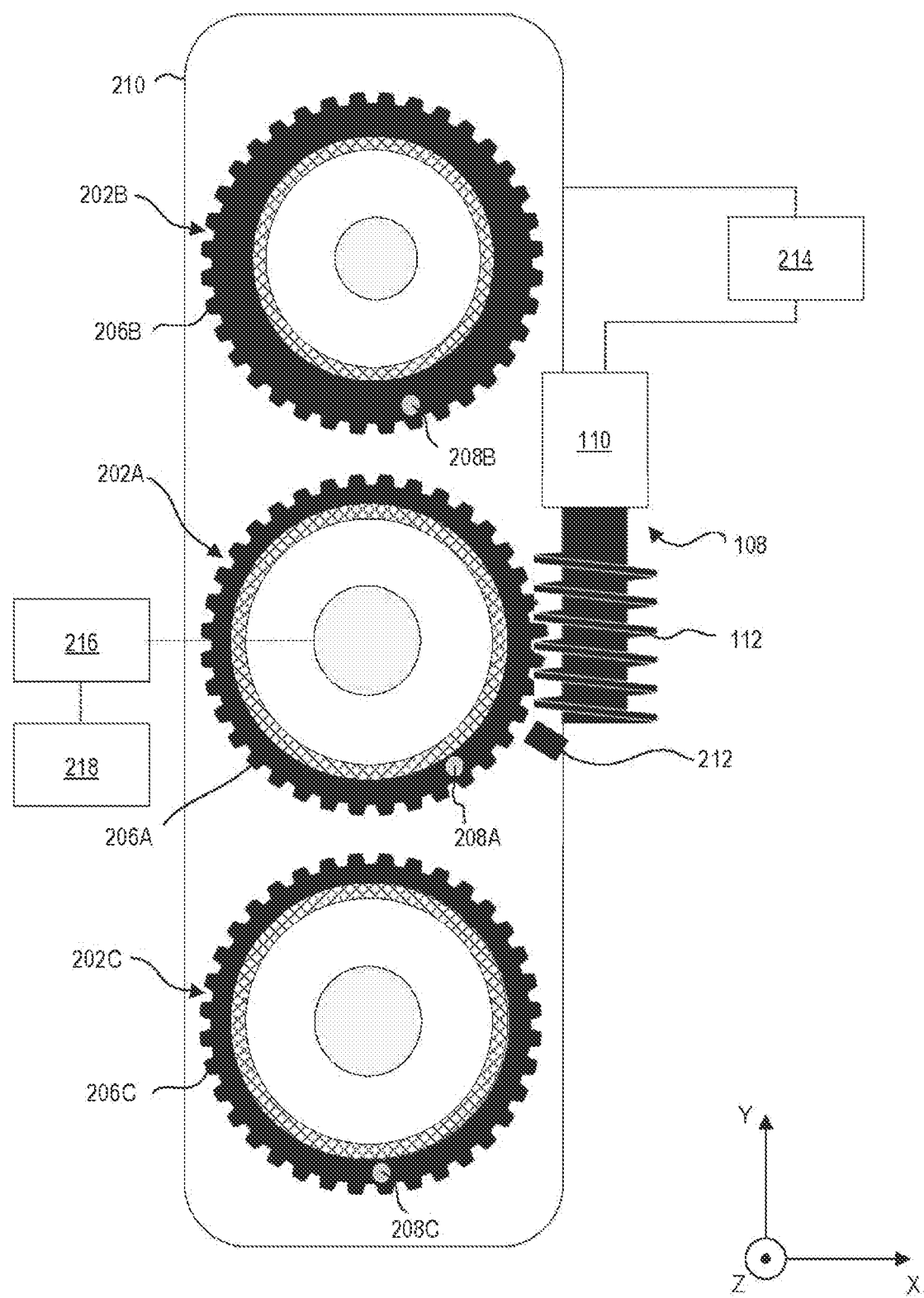
FIG. 2A illustrates example components of a system for motorized adjustment of multiple objective lenses with correction collars.

In some instances, in accordance with the present disclosure, a single adjustment mechanism 108 may advantageously be used to facilitate adjustment of correction collars of multiple objective lenses, thereby avoiding the need for a separate motor for adjusting each correction collar of a microscope system. FIG. 2A illustrates example components of a system for motorized adjustment of multiple objective lenses with correction collars. In particular, FIG. 2A illustrates various objective lenses 202A, 202B, and 202C, each having a respective gear ring 206A, 206B, and 206C fit about a respective correction collar thereof. The objective lenses 202A, 202B, and 202C and the gear rings 206A, 206B, and 206C of FIG. 2A correspond generally to the objective lens 102 and gear ring 106 discussed hereinabove with reference to FIGS. 1A through 1C.

FIG. 2A illustrates the objective lenses 202A, 202B, and 202C, and the respective gear rings 206A, 206B, and 206C in association with an objective lens slider 210. The objective lens slider 210 may facilitate translational movement of the various objective lenses 202A, 202B, and 202C to align selected objective lenses with various components of a microscope system. For example, FIG. 2A conceptually depicts an optical train 216, which may include an arrangement of various optical elements (e.g., lenses, mirrors, beam splitters, filters, and/or others) for carrying out microscope imaging. For example, FIG. 2A conceptually represents the optical train(s) 216 as directing light toward image sensor(s) 218 for acquiring images of samples. The objective lens slider 210 may align the objective lens 202A with the optical train 216 to facilitate imaging of samples visible through the objective lens 202A, as conceptually represented in FIG. 2A.

FIG. 2A illustrates an example adjustment mechanism 108 including a motor 110 and worm gear 112, as before. The adjustment mechanism 108 of FIG. 2A is adjacent to the optical axis of the imaging system shown in FIG. 2A (e.g., the optical axis of objective lens 202A when aligned with the optical train(s) 216). FIG. 2A also illustrates the adjustment mechanism 108 and the objective lens slider 210 as controllable via controller(s) 214. Controller(s) 214 may comprise one or more processors, logic units, registers, control units, integrated circuits, and/or storage media usable to control operation of the adjustment mechanism 108 and the objective lens slider 210 (separate components may be used to control the adjustment mechanism 108 and the objective lens slider 210 separately).

Figure 2B:
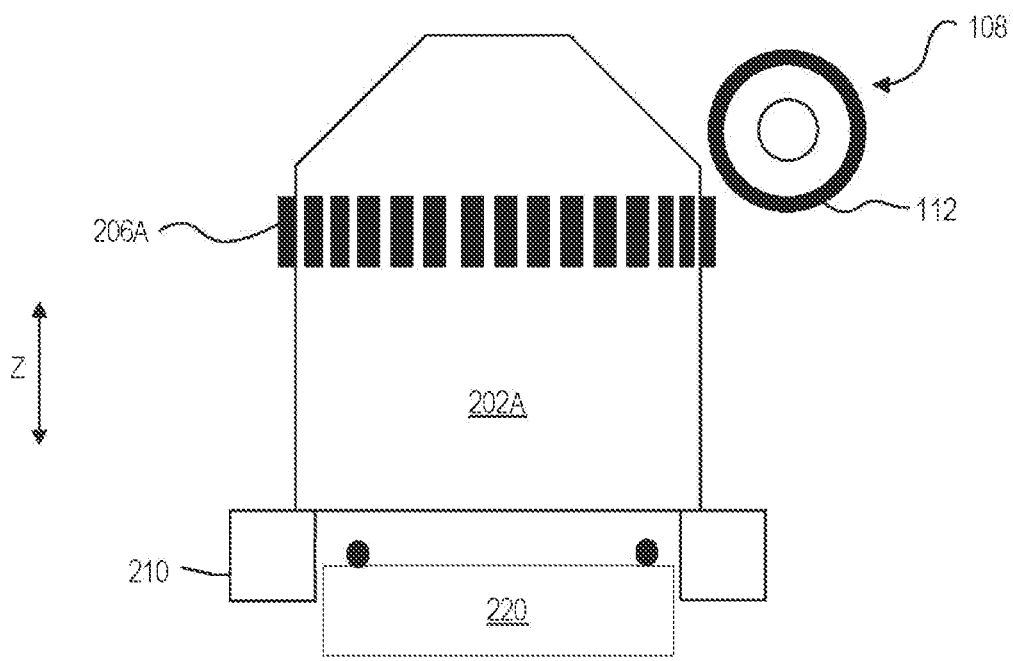
FIGS. 2B and 2C illustrate an example of moving a gear ring of a particular objective lens of a set of objective lenses into engagement with a complementary gear of an adjustment mechanism.
Figure 2C:
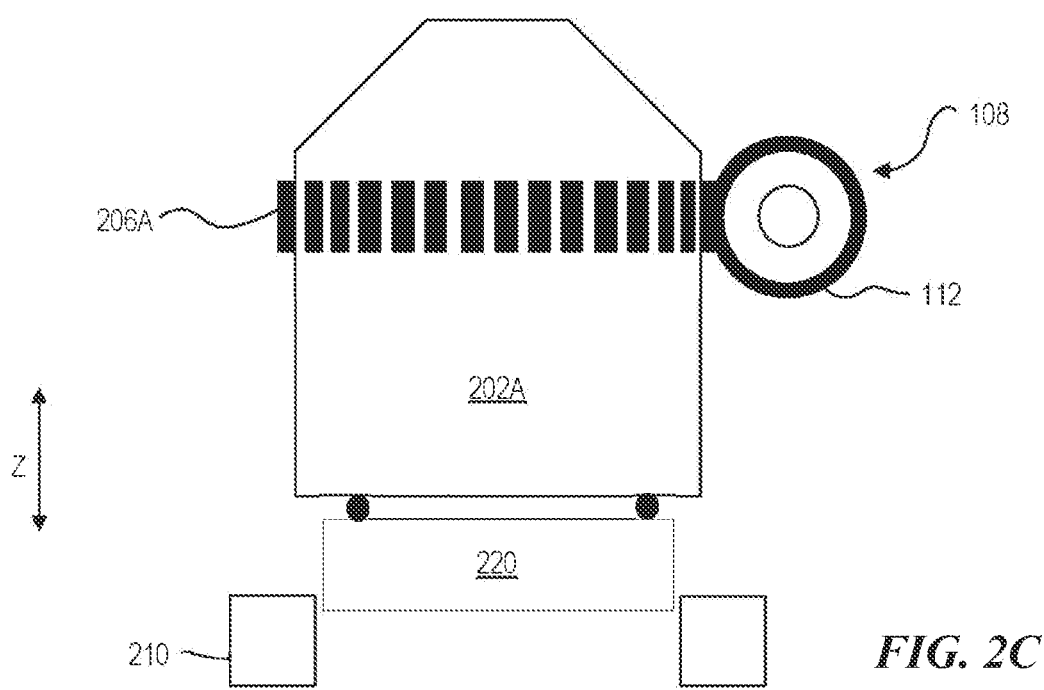

FIG. 2A provides an x, y, z axis for reference. In some implementations, the controller(s) 214 are usable to cause objective lenses of the objective lens slider 210 to translate along the y-axis and the z-axis to allow gear rings 206A, 206B, and 206C of the different objective lenses 202A, 202B, and 202C to align with the worm gear 112 to facilitate correction collar adjustment. For instance, the objective lens slider 210 may translate along the y-axis until the gear ring 206A of objective lens 202A is arranged in alignment with the worm gear 112 but for a z-offset. Referring briefly to FIGS. 2B and 2C, FIG. 2B shows the gear ring 206A of objective lens 202A arranged in alignment with the worm gear 112 but for a z-offset. FIG. 2C shows a Z drive 220 of the objective lens slider 210 translating the objective lens 202A in the z direction to bring the gear ring 206A into engagement with the worm gear to facilitate correction collar adjustment for the objective lens 202A.

Referring again to FIG. 2A, after operating the motor 110 to cause correction collar adjustment for objective lens 202A, the controller(s) 214 may cause the objective lens slider 210 to cause the gear ring 206B of objective lens 202B to selectively engage the worm gear 112 to facilitate correction collar adjustment for objective lens 202B. Such functionality may be performed for any number of objective lenses (e.g., objective lens 202C).

In some instances, to facilitate alignment of the adjustment mechanism 108 with different gear rings 206A, 206B, or 206C, the adjustment mechanism 108 (or at least the worm gear 112 of the adjustment mechanism) is additionally or alternatively translatable along the y-axis and/or the z-axis.

In some instances, objective lenses comprise different lens diameters. For example, as shown in FIG. 2A, objective lens 202B comprises a smaller diameter than objective lenses 202A or 202C. In some instances, to allow the adjustment mechanism 108 to accommodate objective lenses of different diameters, gear rings of different inner diameters may be placed on different objective lenses. The gear rings placed on the different objective lenses may have the same outer diameter, notwithstanding their different inner diameters, thus allowing the adjustment mechanism 108 to more readily interface with different gear rings associated with different objective lenses of different diameters.

For instance, in FIG. 2A, gear ring 206B of objective lens 202B has a smaller inner diameter than gear ring 206A of objective lens 202A, while both gear ring 206B and gear ring 206A have the same outer diameter. The smaller inner diameter of gear ring 206B allows the gear ring 206B to fit about the correction collar of objective lens 202B, while the larger inner diameter of gear ring 206A allows the gear ring 206A to fit about the correction collar of objective lens 202A. The uniform outer diameter of gear rings 206A and 206B allows both gear rings 206A and 206B to interface with the worm gear 112 for adjustment.

In some implementations, to accommodate objective lenses with different lens diameters, the objective lens slider 210 and/or the adjustment mechanism 108 (e.g., the worm gear 112 of the adjustment mechanism 108) are translatable along the x-axis to allow different objective lenses to interface with the adjustment mechanism 108. This may be utilized, for example, where differently sized objective lenses have gear rings of similar thicknesses and thus the overall outer diameters are different.

In the example shown in FIG. 2A, each objective lens 202A, 202B, and 202C is associated with a respective magnet 208A, 208B, and 208C. FIG. 2A also illustrates a hall effect sensor 212 associated with the system depicted in FIG. 2A. In some implementations, the hall effect sensor 212 and the magnets 208A, 208B, and 208C operate in combination to determine the homing position of each of the correction collars of the objective lenses 202A, 202B, and 202C. In this regard, the magnets 208A, 208B, and 208C may be used for calibrating the adjustment mechanism 108 to carry out desired adjustment operations for the various objective lens correction collars.

In some instances, the magnets 208A, 208B, and/or 208C are affixed to the gear rings 206A, 206B, and/or 206C, respectively. In some instances, the magnets 208A, 208B, and/or 208C are affixed to the correction collars of the objective lenses 202A, 202B, and/or 202C separate from the gear rings 206A, 206B, and/or 206C (e.g., on separate rings that are affixed to the correction collars). In some embodiments, the positions of the Hall effect sensor and the magnets are swapped. For example, each objective lens 202A, 202B, 202C and/or gear ring 206A, 206B, 206C may incorporate a Hall effect sensor to enable positional reference to a reference magnet. In some implementations, other sensor mechanisms aside from a hall effect sensor and magnets are used to determine the home position for the various gear rings relative to the adjustment mechanism (e.g., optical sensors, limit switches, etc.)

One will appreciate, in view of the present disclosure, that the example systems discussed with reference to FIGS. 2A-2C may include additional or alternative components not explicitly shown in FIGS. 2A-2C. For instance, a system may comprise any number of processors and/or hardware storage devices to carry out any of the disclosed functions (e.g., associated with the functioning of the controller(s) 214 and/or image sensor(s) 218). Furthermore, in some instances, a system comprises an aberration detection component, such as a focal detection unit (FDU) and/or modules for optimizing focus position utilizing signal processing techniques (e.g., phase detection, contrast detection, etc.).

Figure 2D:
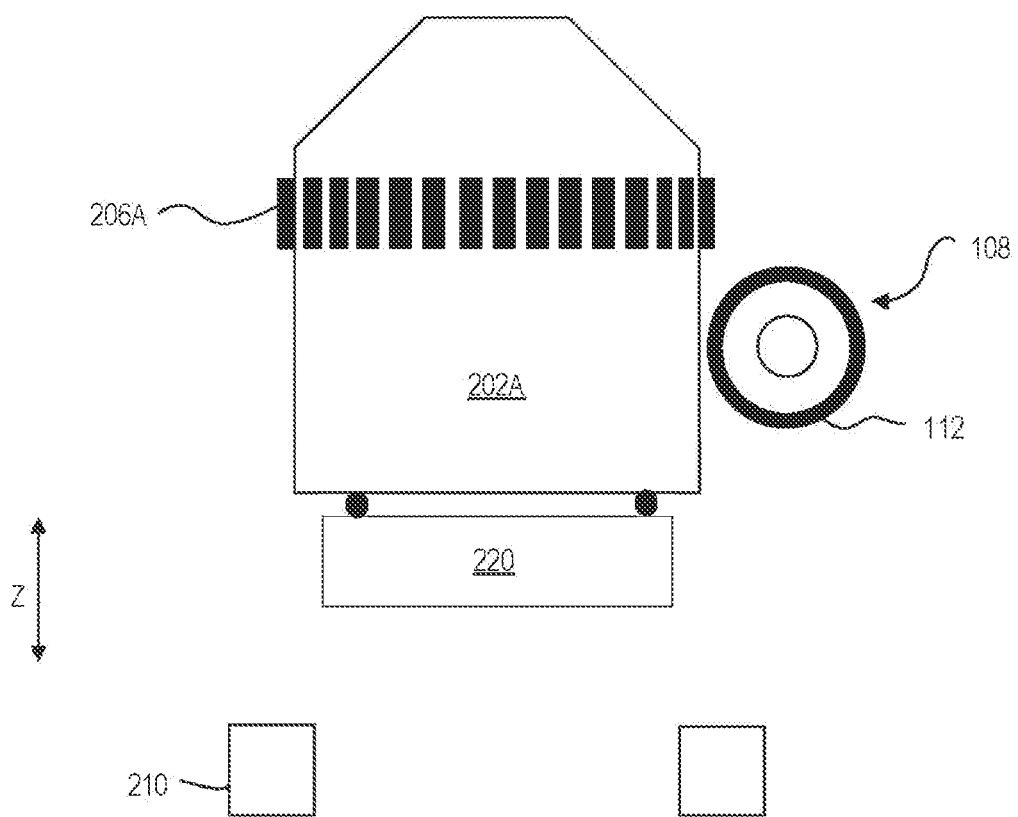
FIG. 2D illustrates an example of disengaging a gear ring of an objective lens correction collar from an adjustment mechanism to facilitating imaging.

Referring again to FIGS. 2B and 2C, in some instances, a correction collar of an objective lens 202A is adjusted prior to focusing the objective lens 202A for imaging. For example, FIG. 2B may represent a start position for the objective lens after translating the objective lens 202A in the y-direction via the objective lens slider 210 (e.g., using controller(s) 214) in preparation for imaging. The Z drive 220 may then translate the objective lens 202A in the z-direction to cause the gear ring 206A of the objective lens 202A to engage with the worm gear 112 of the adjustment mechanism 108. The controller(s) 214 may then operate the motor 110 to rotate the worm gear 112 and the gear ring 206A to carry out any desired adjustments to the correction collar of the objective lens 202A. The adjustments may be made to accommodate the thickness of the vessel carrying the sample to be imaged (e.g., the bottom of the vessel for inverted microscopes). For example, vessel thicknesses may be stored in a data structure (e.g., a table) with corresponding correction collar settings optimized for each vessel thickness, and the correction collar may be adjusted based on the data structure (with possible interpolation). Subsequently, the controller(s) 214 may advance the objective lens 202A further in the z-direction to a desired z height for imaging (or a plurality of z heights to obtain a z-stack). For example, FIG. 2D illustrates the objective lens 202A driven beyond the worm gear 112 in the z-direction to a desired z height for imaging. In this way, external forces (e.g., forces from the worm gear 112) on the objective lens 202A may be avoided during imaging.

In some embodiments, however, at least a portion of the adjustment mechanism 108 is configured to remain engaged (or nearly engaged) with the gear ring 206A of the objective lens 202A during imaging to allow for correction collar adjustments during an imaging protocol (e.g., a z-stack protocol). For example, in some instances, at least a portion of the adjustment mechanism 108 is configured to translate in the z-direction with the objective lens 202A (e.g., via a z-drive) to allow for correction collar adjustments during imaging. In some implementations, the height of the gear ring 206A is selected to allow the gear ring 206A to remain accessible to the adjustment mechanism 108 (e.g., accessible to the worm gear 112 thereof) for a range of objective lens z-heights for imaging.

In some implementations where the adjustment mechanism 108 is configured for adjusting the correction collar of the objective lens 202A during imaging, there is a risk that vibrational forces of the motor of the adjustment mechanism 108 disturb the objective lens 202A during imaging, thereby affecting image quality. Thus, to prevent vibrational forces of the motor from disturbing the objective lens during imaging, the adjustment mechanism 108 may be configured or controlled to perform a reverse step after adjusting the gear ring 206A to bring the adjustment mechanism 108 out of contact with the gear ring 206A.

For example, a system may cause the worm gear 112 to rotate in a first direction to cause the gear teeth of the worm gear 112 to contact the gear teeth of the gear ring 206A. The system may cause the worm gear 112 to continue to rotate in the first direction to cause the gear ring 206A to correspondingly rotate and facilitate an adjustment to the correction collar of the objective lens 202A. After the adjustment, the system may perform a reverse step to cause the worm gear 112 to rotate in a second direction (opposite the first direction) to bring the gear teeth of the worm gear 112 out of contact with the gear teeth of the gear ring 206A (capitalizing on the play between the gear teeth). When the gear teeth of the worm gear 112 and the gear ring 206A are disengaged after a reverse step as described above, (i) vibrations from the motor of the adjustment mechanism 108 may be prevented from reaching the gear ring 206A of the objective lens, and (ii) the worm gear 112 may remain readily positioned relative to the gear ring 206A to effectuate subsequent correction collar adjustments.

In some instances, the controller(s) 214 controlling the adjustment mechanism 108 operate in conjunction with a focus detection unit (FDU) (or other component(s) for detecting aberration) to automatically calculate a correction collar position/setting based on data provided via the FDU (e.g., physical information of the optical interfaces of the array detector of the FDU, such as fitted peak positions of the top and bottom reflex of the sample window). For example, the FDU may comprise a light source (e.g., a laser) that emits light (e.g., collimated light) toward a cover substrate (e.g., toward a bottom side of a glass coverslip) of a sample. The FDU may further comprise an array detector configured to detect light emitted by the light source and reflected by the cover substrate. The array detector may detect a first peak associated with light reflected from a first side of the cover substrate (e.g., the bottom of a coverslip) and a second peak associated with light reflected from a second side of the cover substrate (e.g., the top of a coverslip, after the light passes through the bottom side of the coverslip and transmits through the coverslip substrate). The offset between the first and second peaks may be used to detect a thickness of the cover substrate.

The detected thickness of the cover substrate may be used as an input (e.g., automatically) to cause the adjustment mechanism 108 to adjust the correction collar of an objective lens (e.g., via a gear ring) to compensate for aberrations associated with the detected thickness The principles described herein can be applied to substantially any type of microscope objective that includes a correction collar (e.g., in inverted microscopes or upright microscopes).

Figure 3:
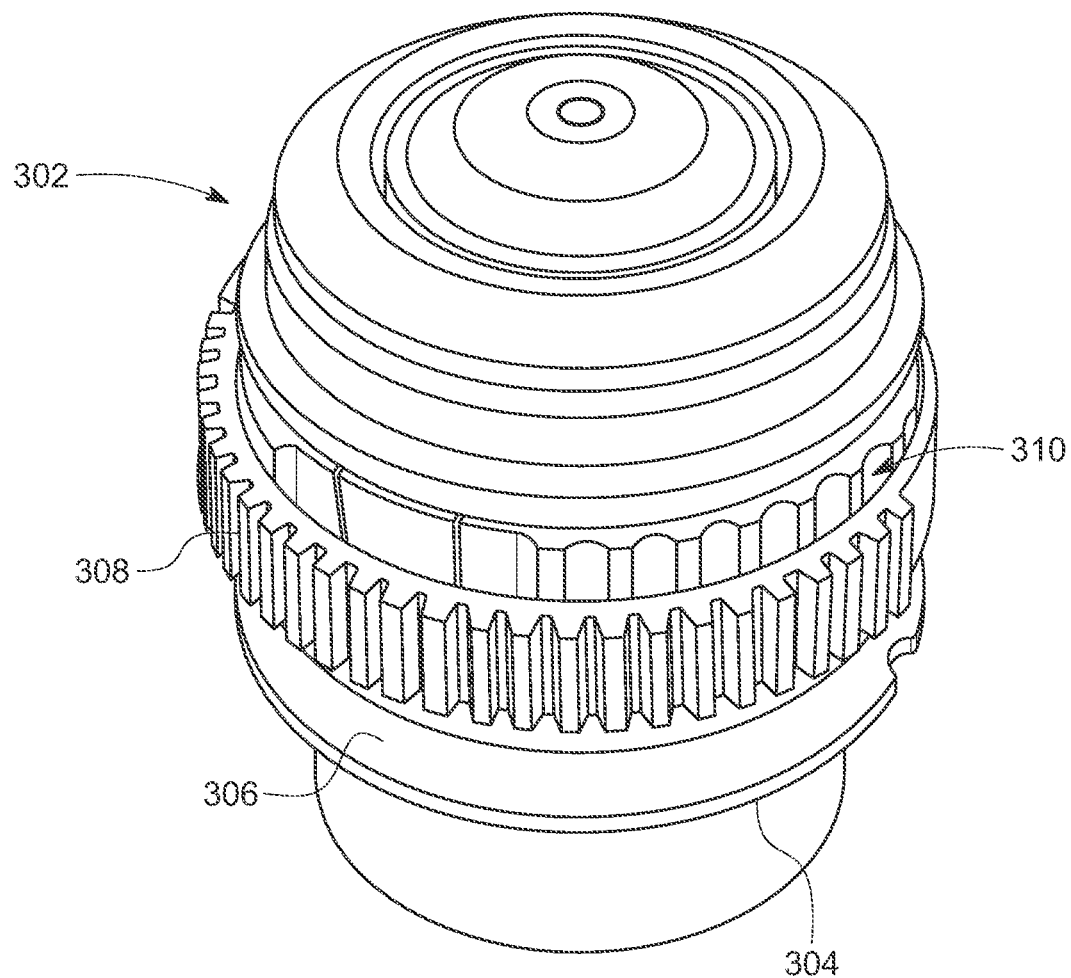
FIGS. 3, 4, 5A, and 5B illustrate example representations of objective lenses that include correction collars and gear rings.

FIGS. 3, 4, 5A, and 5B illustrate example representations of objective lenses that include correction collars and gear rings. In FIG. 3, the objective lens 302 includes a magnet 304 affixed to a ring 306 that is separate from the gear ring 308 connected to the correction collar 310 of the objective lens 302. As noted above, however, a magnet may be attached to the gear ring 308 itself or to a separate part of the objective lens 302.

Figure 4:
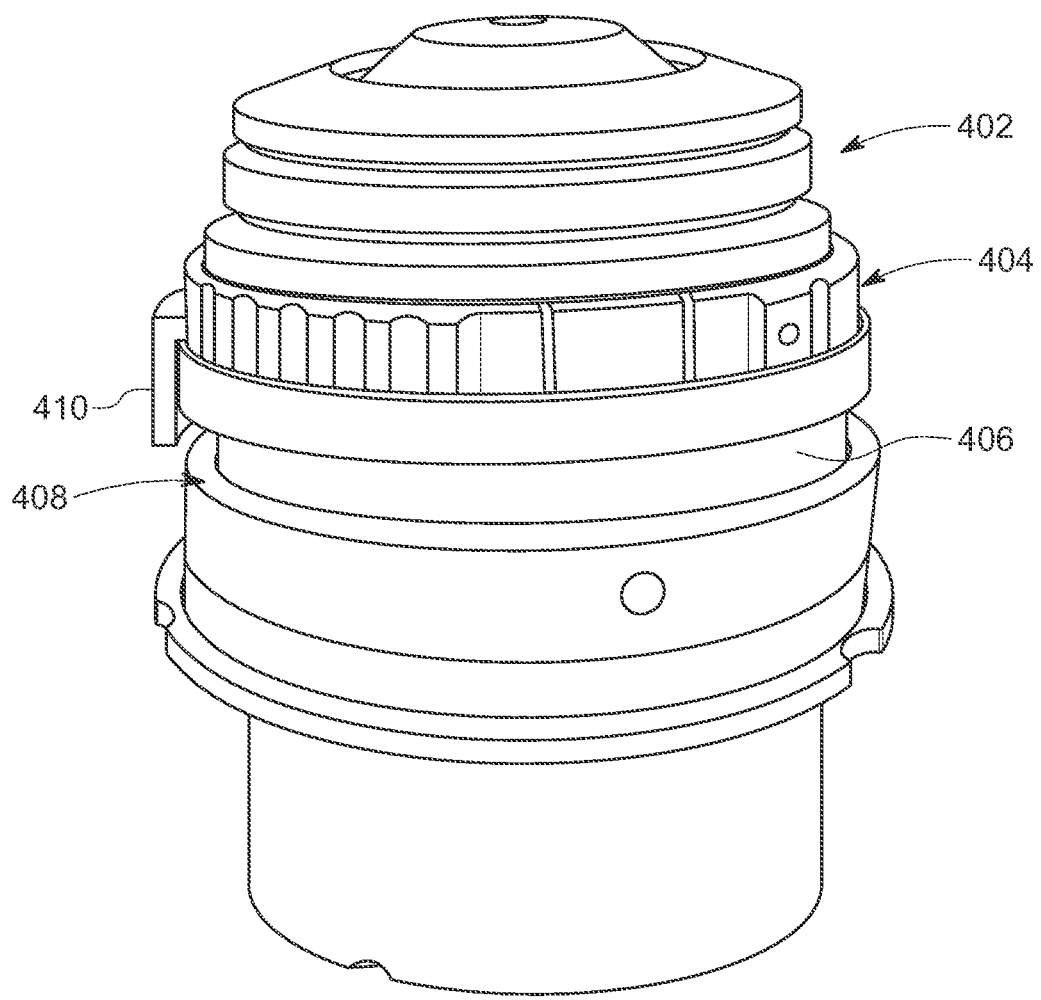

In FIG. 4, the objective lens 402 has a correction collar 404 with an adjustment range of about 120-150° (e.g., for Zeiss objective lenses). The correction collar 404 also includes numerical indicators 406 showing the different cover glass thicknesses (e.g., from 0.14 mm to 0.19 mm) that the correction collar 404 can be configured to accommodate. In the example shown in FIG. 4, the objective lens 402 includes a gear ring 410 that has a window 408 that exposes the numerical indicators 406 of the correction collar 404. Such functionality allows users to ensure proper operation and/or calibration of the adjustment mechanism 108. Furthermore, in the example of FIG. 4, the gear ring 410 omits teeth in the region that includes the window 408.

Figure 5A:
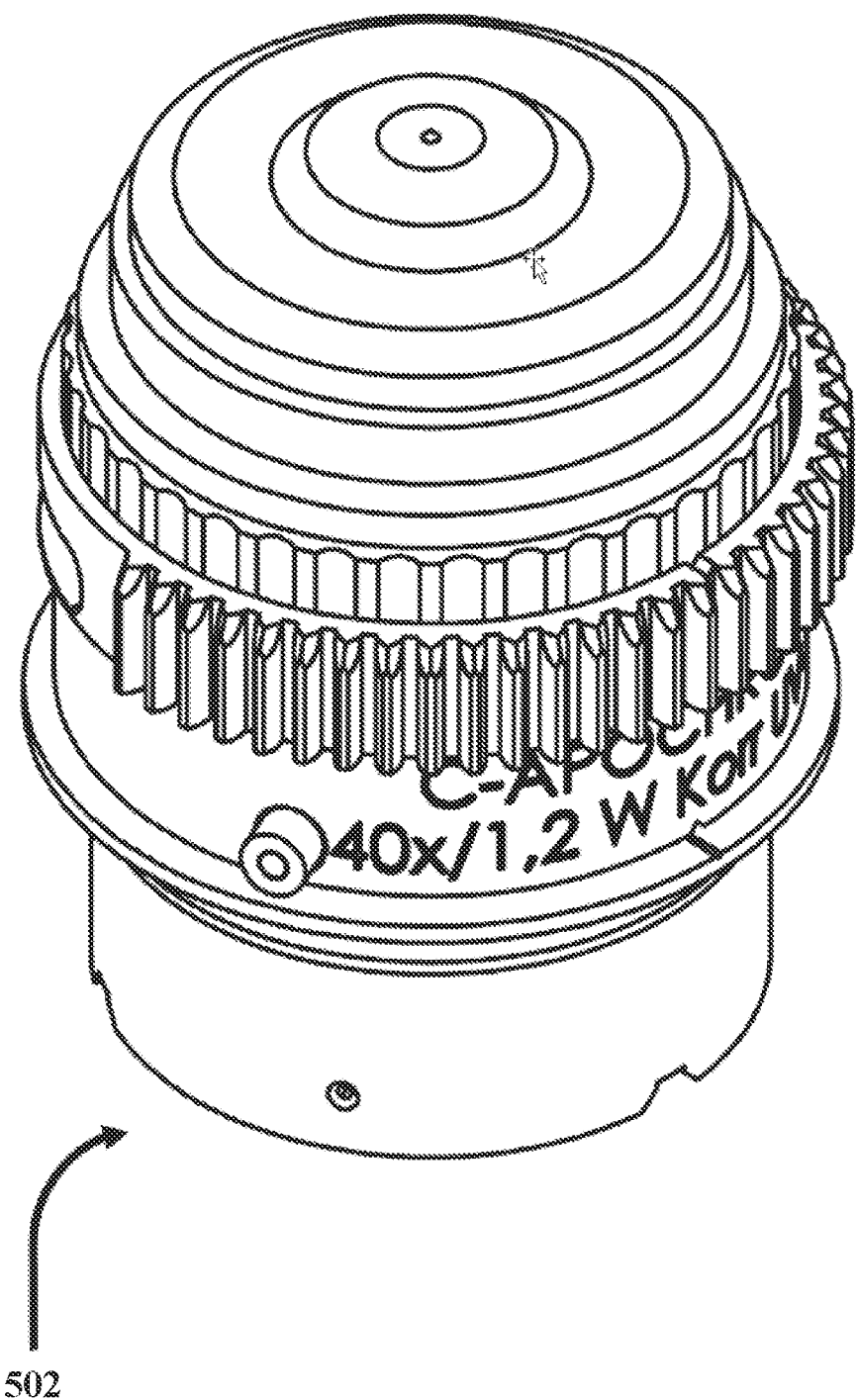
Figure 5B:
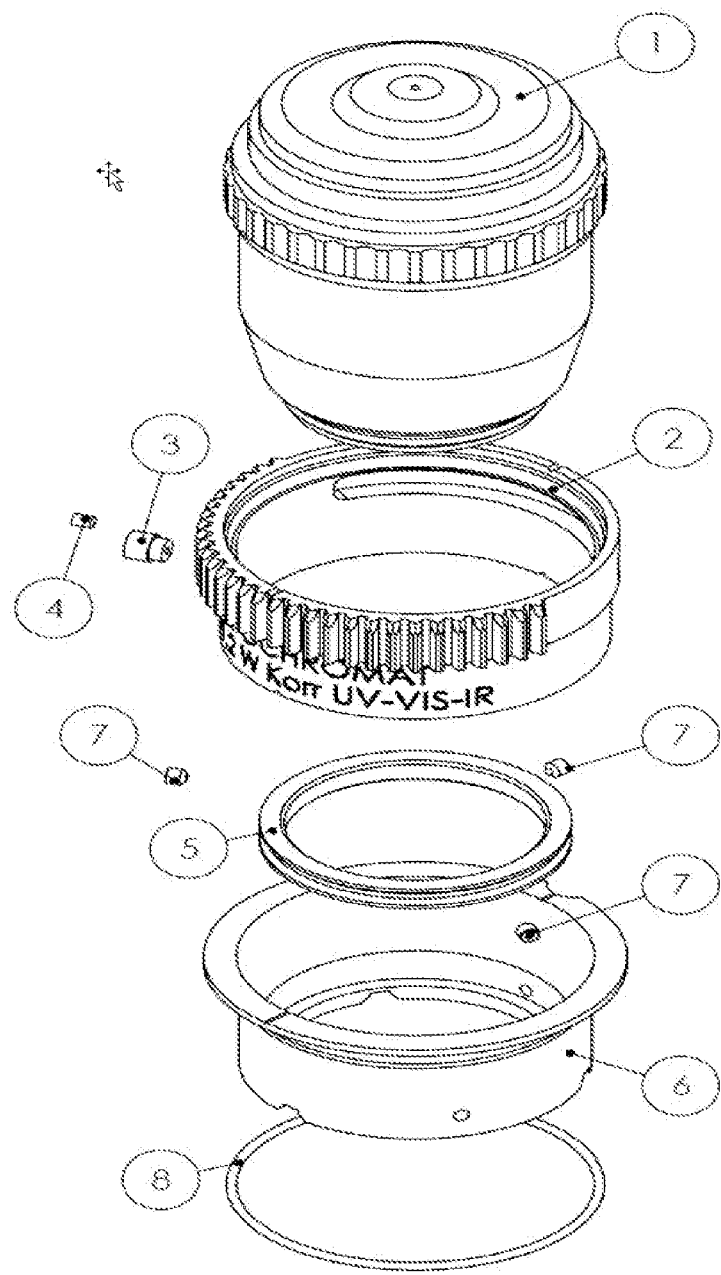

FIG. 5A illustrates an example objective lens 502 that includes a correction collar and gear ring, in accordance with the present disclosure. FIG. 5B provides an exploded view of the components shown in FIG. 5A. Part 1 of FIG. 5B is the example objective lens, implemented as a ZEISS C-Apochromat 40×/1.2 W Korr UV-VIS-IF. Part 2 of FIG. 5B is a gear implemented as a C-APO 40×/1.2 gear. Part 3 of FIG. 5B is a socket magnet, and part 4 is a magnet. Part 5 of FIG. 5B is a threaded ring, and part 6 is a turnable objective pot/cup. Parts 7 are set screws, and part 8 is an O-ring. The particular forms of this embodiment are exemplary, and other like parts may be utilized.

Components shown in FIG. 5B beneficially enable the use of different types and models of objective lenses in a system for motorized adjustment of objective lens correction collars. For example, using a threaded ring (Part 5) for attachment to the objective pot/cup (Part 6) allows the objective to be rotated relative to the pot/cup to an operable position. Otherwise, the threads of the standard components may not lead to the desired, operable orientation when fully tightened. That is, because the gear ring (Part 2) needs to be oriented in a manner to appropriately interface with the adjustment mechanism, the ability to adjust the orientation provides for effective positioning without the need to modify or custom make the standard objectives and/or pot/cup components.

FIGS. 6, 7, 8, and 9 illustrate example depictions of graphical user interfaces associated with operation of a system for motorized adjustment of an objective lens correction collar. The techniques described herein may implement one or more computer systems that include one or more processors, hardware storage devices, and/or user interfaces for presenting content to users and receiving user inputs. The one or more computer systems may allow users to select motorized correction collar functions and calibrate individual objective lenses. During calibration, user can be prevented from performing other microscope actions (e.g., the system may block users from accessing other functions during calibration).

Figure 6:
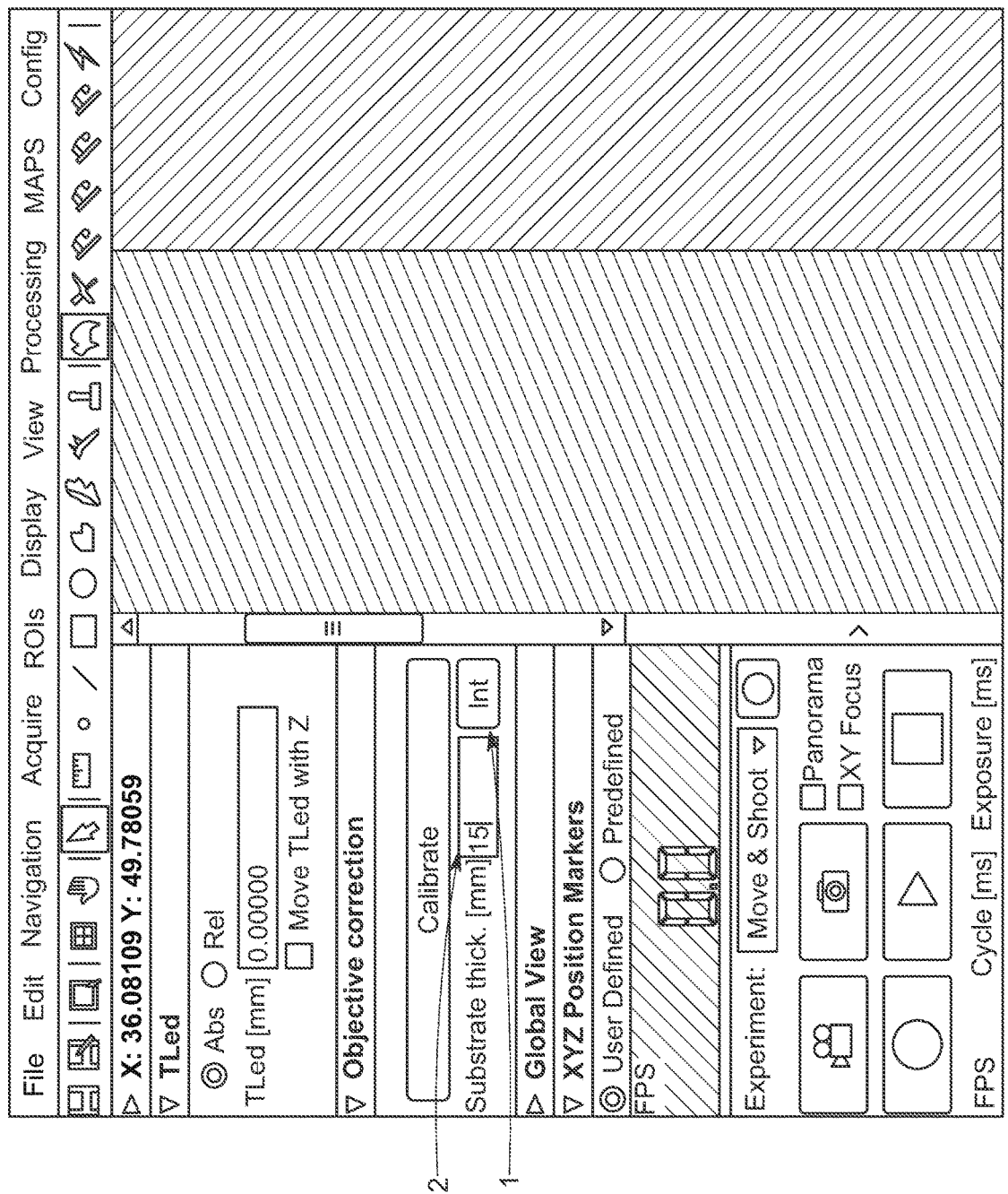

FIG. 6 illustrates an example graphical user interface (GUI) for operating a correction collar adjustment mechanism (e.g., adjustment mechanism 108). Element 1 of FIG. 6 is a selectable initialization button for causing a correction collar adjustment mechanism to actuate into a homing position (e.g., causing a magnet of a correction collar gear ring to become aligned with a hall effect sensor of the correction collar adjustment mechanism). The homing position may establish a starting point for facilitating calibration of the correction collar adjustment system (e.g., to establish a relationship between motor step/actuation and correction collar setting) and may allow the system to accommodate mechanical limits associated with the hardware. Element 2 of FIG. 6 is a textbox for receiving user input indicating a substrate thickness. Other selection features may be implemented in addition or in alternative to the textbox (e.g., a drop-down menu, selectable arrows, mouse wheel functionality, etc.).

Figure 7:
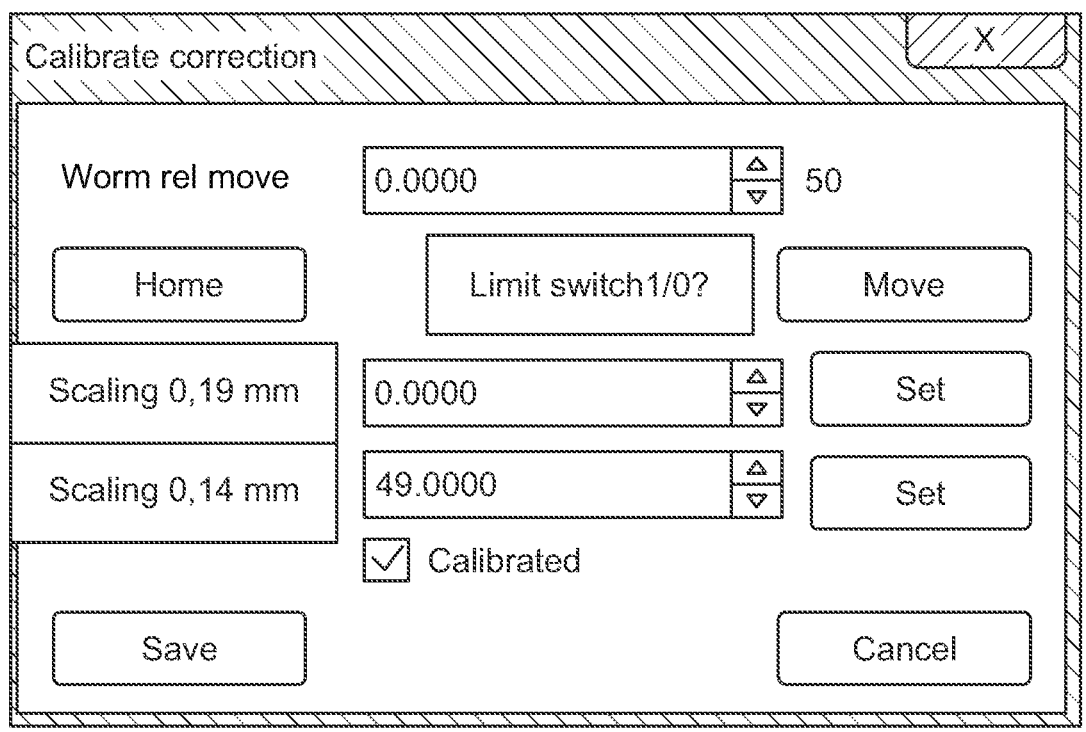

FIG. 7 illustrates a graphical user interface for calibrating a correction collar adjustment mechanism (e.g., adjustment mechanism 108). The scaling of an objective lens correction collar may be a function of the worm gear and the stepper motor gear. The GUI of FIG. 7 may display the physical movement of the worm gear position. Calibration from the scaling numbers selected can be interpolated (e.g., linearly). The GUI of FIG. 7 also shows a limit switch monitor, which may indicate whether the homing position was detected via the hall effect sensor and the magnet (e.g., by displaying a "1" or a "0"). In some instances, if the homing position is not detected, the user is required to adjust the z-height of the objective lens (or worm gear 112), while other microscope functions are disabled.

Figure 8:
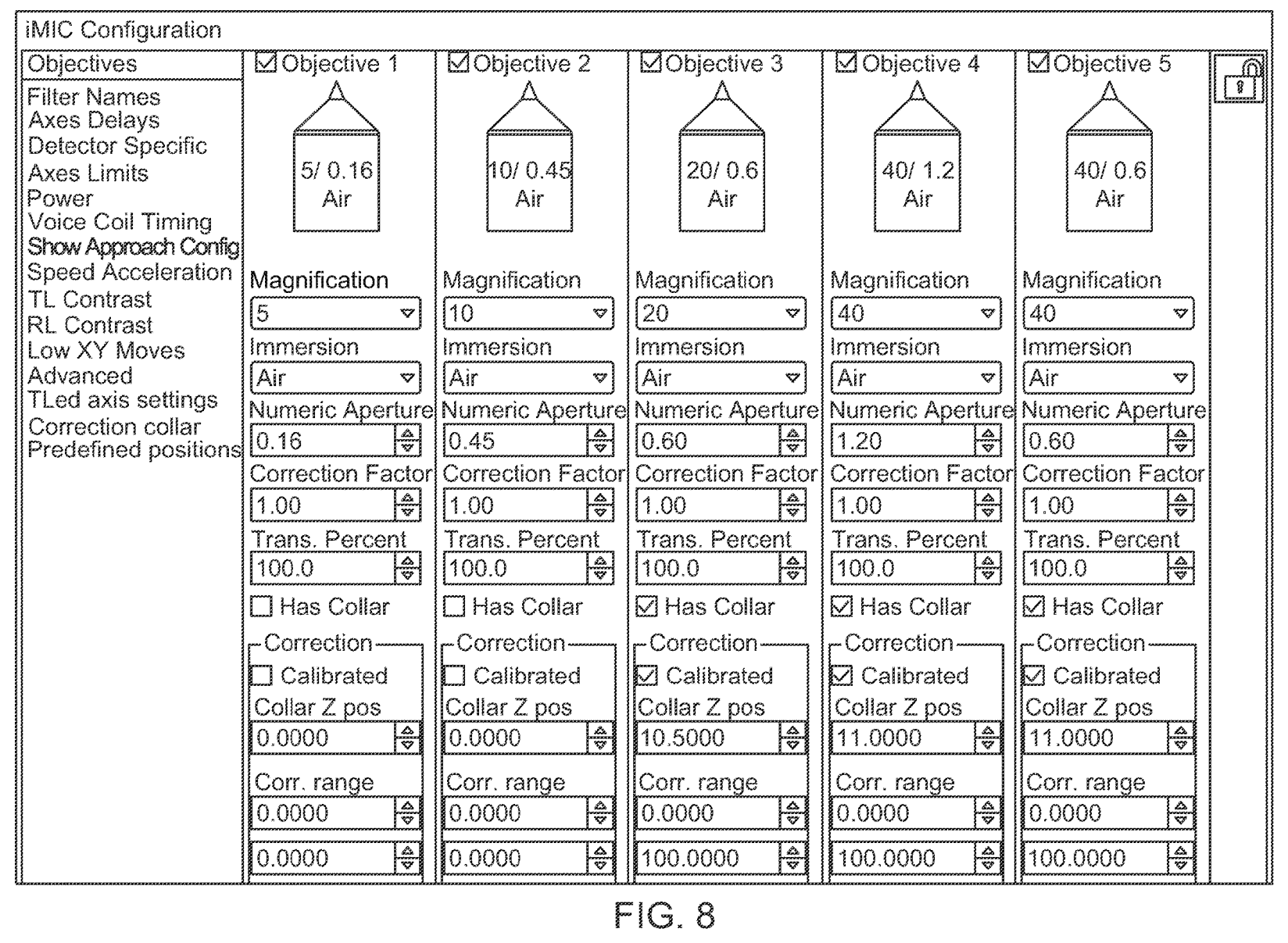

FIG. 8 illustrates various calibration settings and/or parameters that may be stored for different objective lenses for different imaging conditions (e.g., for different immersion media). At least some of the data may be obtained based on focal detection unit (FDU) data.

Figure 9:
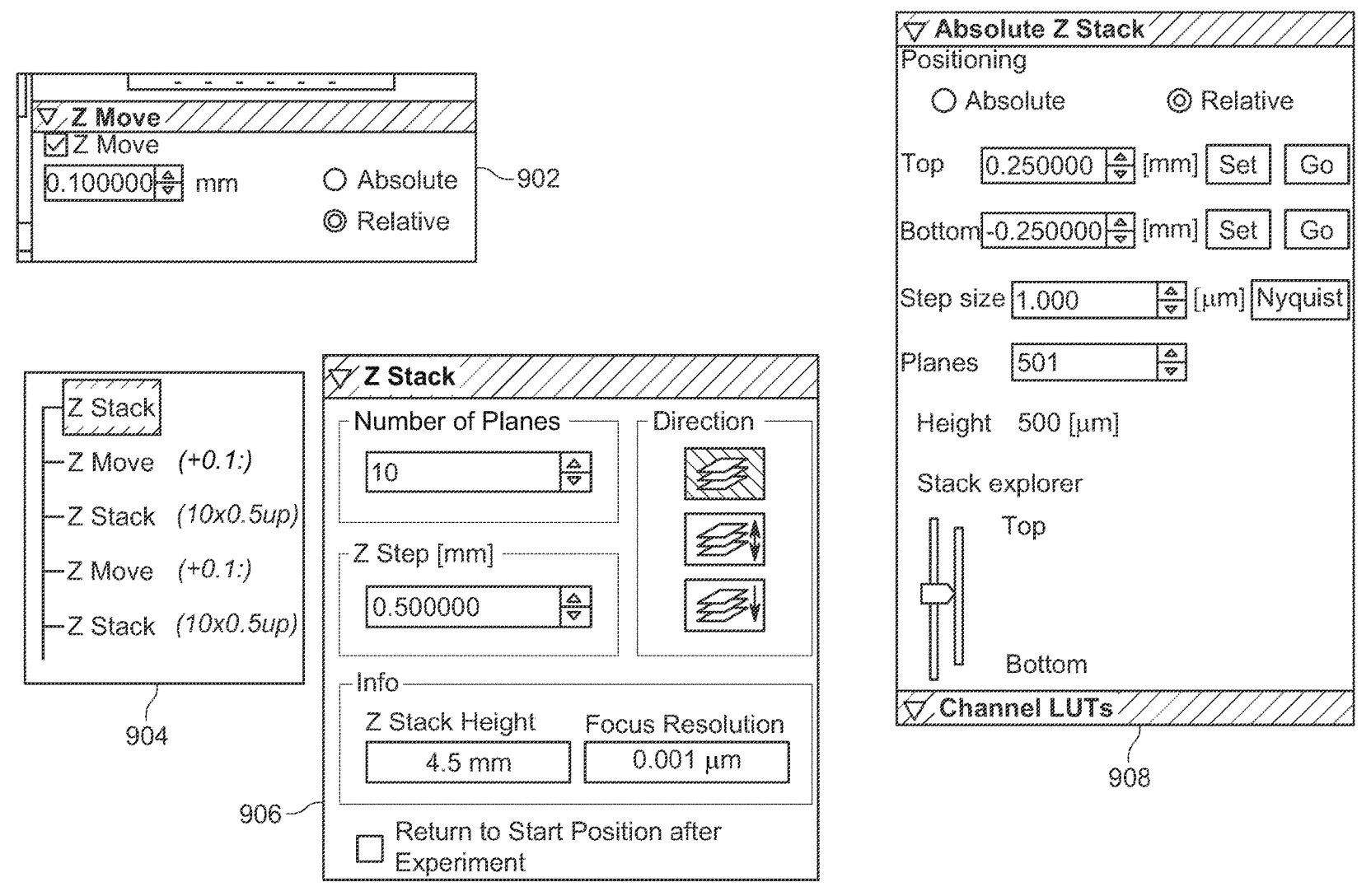

FIG. 9 illustrates various GUIs associated with adapting correction collar adjustments (via adjustment mechanism 108 and controller(s) 214) within a z-stack protocol. In some implementations, a test is performed by manually driving the objective through a thick sample while adjusting the correction collar at various points to optimize intensity of the image (e.g., while recording the correction collar values that provide optimal intensity). The correction collar starting value may then be set, and a correction collar move protocol may be used to defined specific correction collar adjustments (e.g., negative or positive adjustments) (see GUI 902). The correction collar adjustments may then be built into a protocol from partial z-stacks (e.g., with the "Return to Start Position after Experiment" setting unchecked), with the correction collar adjustments implemented to adapt the correction collar setting over the various z positions (see GUIs 904 and 906).

In some implementations, the correction collar adjustments are included in the z-stack protocol itself. For example, functionality may be provided that allows users to modify (1) collar step size, (2) z-step count between collar steps (which may be interpolated), and (3) number of collar steps (which may be interpolated) (see GUI 908).

Exemplary Methods for Imaging Using Objective Lens Correction Collars

The following discussion now refers to a number of methods and method acts that may be performed (e.g., by one or more systems that includes components discussed herein, such as controller(s) 214, motor 110, image sensor(s) 218, worm gear 112, hall effect sensor 212, magnets, gear rings, objective lenses, objective lens slider 210, etc.). Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 10:
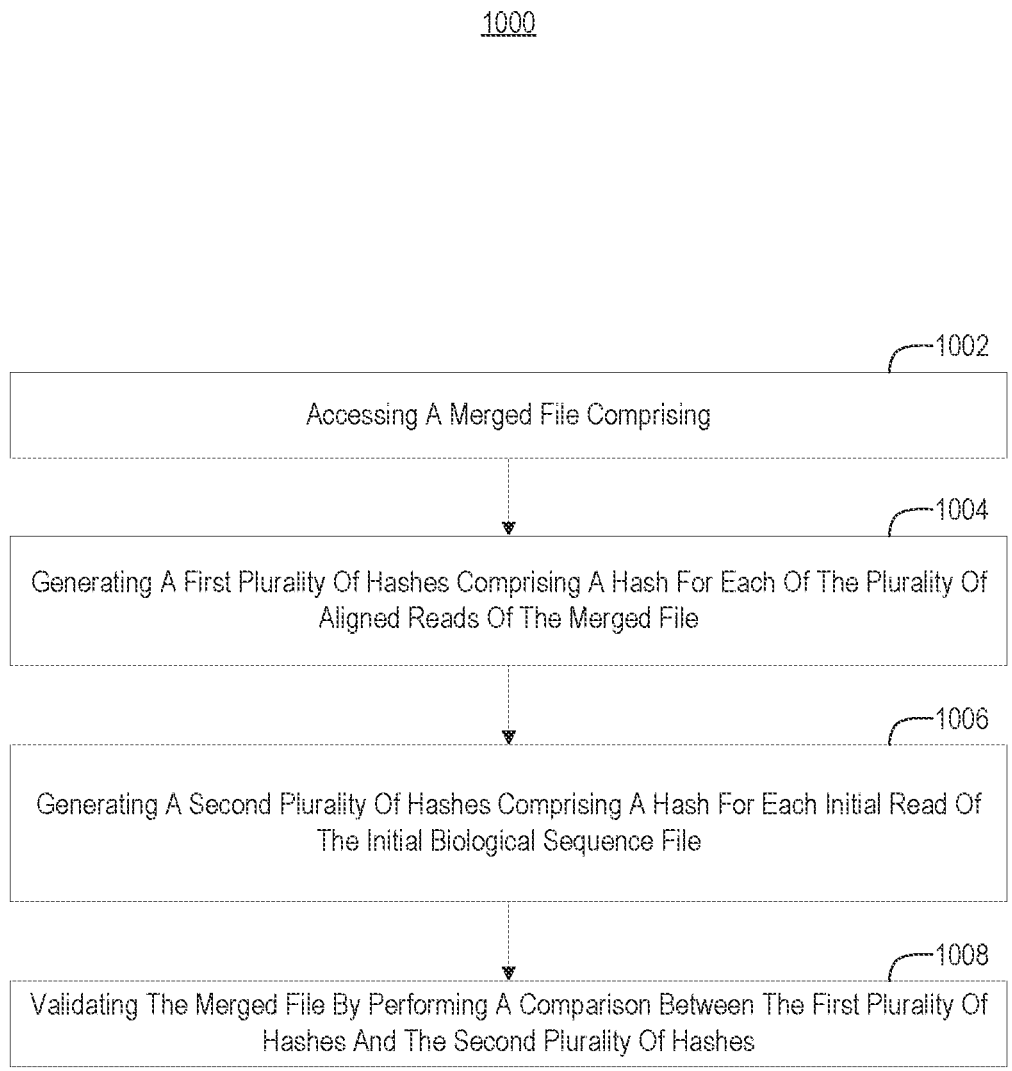
FIG. 10 illustrates an example flow diagram depicting acts associated with motorized adjustment of an objective lens correction collar.

FIG. 10 illustrates an example flow diagram 1000 depicting acts associated with motorized adjustment of an objective lens correction collar. The acts associated with diagram 1000 can incorporate and/or utilize one or more of the system components described above with respect to FIGS. 1A-9. Accordingly, some elements recited in the acts below include parenthetical references to elements described hereinabove for illustrative purposes.

Act 1002 of flow diagram 1000 includes positioning an objective lens translation device (e.g., objective lens slider 210, or an objective lens turret) at a first position, the objective lens translation device comprising an objective lens (202A) having a correction collar fitted with a gear ring (206A). Act 1004 of flow diagram 1000 includes identifying a type of the objective lens (202A) having the correction collar. One or more attributes of the objective lens may be obtained/utilized for future adjustments to the correction collar of the objective lens.

Act 1006 of flow diagram 1000 includes engaging a z drive (e.g., Z drive 220) to move the objective lens (202A) across a z-distance to a correction collar adjustment position, wherein the gear ring (206A) associates with a complementary gear (e.g., worm gear 112) of an adjustment mechanism (108) at the correction collar adjustment position. In some implementations, the z-distance between the first position and the correction collar adjustment position is based on the type of the objective lens (e.g., as determined above in accordance with act 1004).

Act 1008 of flow diagram 1000 includes engaging a motor of the adjustment mechanism to adjust the correction collar. In some implementations engaging the motor causes movement of the complementary gear, and movement of the complementary gear is translated to the gear ring fitted about the correction collar. Furthermore, in some implementations, adjusting the correction collar corrects one or more aberrations produced by the objective lens adjusting the correction collar. Still furthermore, in some instances, a degree by which the correction collar is adjusted is dependent on particular imaging parameters associated with the objective lens and/or a medium through which light passes along the imaging path.

Additional Computer System Details

A system configured for implementing disclosed techniques may include various hardware elements, such as one or more processors and/or one or more hardware storage devices. A system may comprise any number of additional or alternative components and may take on various forms.

A processor may comprise one or more sets of electronic circuitries that include any number of logic units, registers, and/or control units to facilitate the execution of computer-readable instructions (e.g., instructions that form a computer program). Such computer-readable instructions may be stored within computer-readable storage (e.g., hardware storage). The storage may comprise physical system memory and may be volatile, non-volatile, or some combination thereof. Furthermore, storage may comprise local storage, remote storage (e.g., accessible via communication system(s) or otherwise), or some combination thereof.

Processors may be configured to execute instructions stored within computer-readable storage to perform certain actions associated with facilitating rapid genome sequence analysis. The actions may rely at least in part on data stored on computer-readable storage in a volatile or non-volatile manner.

In some instances, the actions may rely at least in part on one or more communication systems for receiving data and/or instructions from one or more remote systems, which may include, for example, separate systems or computing devices/nodes/clusters, sensors, and/or others. The communications system(s) may comprise any combination of software or hardware components that are operable to facilitate communication between on-system components/devices and/or with off-system components/devices. For example, the communications system(s) may comprise structures, ports, buses, or other connection apparatuses for communicating with other devices/components. Additionally, or alternatively, the communications system(s) may comprise systems/components operable to communicate wirelessly with external systems and/or devices through any suitable communication channel(s), such as, by way of non-limiting example, Bluetooth, ultra-wideband, Wi-Fi, WLAN, infrared communication, and/or others.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the embodiments disclosed herein may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The embodiments disclosed herein may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

In some implementations, systems of the present disclosure may comprise or be configurable to execute any combination of software and/or hardware components that are operable to facilitate processing using machine learning models or other artificial intelligence-based structures/architectures. For example, one or more processors may comprise and/or utilize hardware components and/or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the disclosure as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

What is claimed is:

1. A system for selectively adjusting an objective lens correction collar, comprising:
   a gear ring sized and shaped to fit about a correction collar of an objective lens;
   an adjustment mechanism comprising a motor operably connected to a complementary gear configured to selectively engage and cause movement of the gear ring, thereby adjusting the correction collar; and
   an objective lens translation device configured to selectively move the objective lens from a first position to a correction collar adjustment position, wherein at the first position, the complementary gear does not engage the gear ring, and wherein at the correction collar adjustment position, the complementary gear engages the gear ring.

2. The system of claim 1, wherein the objective lens translation device comprises an objective lens slider or an objective lens turret.

3. The system of claim 1, wherein the first position and the correction collar adjustment position are separated by a z-distance, and wherein the objective lens translation device comprises a z drive configured to move the objective lens by at least the z-distance.

4. The system of claim 1, wherein the adjustment mechanism is secured at a fixed position.

5. The system of claim 1, wherein the complementary gear is configured to move within at least one dimension of a two-dimensional plane.

6. The system of claim 1, wherein the adjustment mechanism comprises a worm drive.

7. The system of claim 1, wherein the complementary gear comprises a non-enveloping worm gear or a globoid worm gear.

8. The system of claim 1, wherein the complementary gear comprises an intermeshing gear that forms a gear train with the gear ring at the correction collar adjustment position, and wherein the intermeshing gear is rotatable in a same plane as the gear ring at the correction collar adjustment position.

9. The system of claim 1, wherein the gear ring and the complementary gear comprise an interlocking fit when selectively engaged, and wherein the interlocking fit is formed by teeth on the gear ring that are sized, shaped, and angled to mate with the complementary gear.

10. The system of claim 1, comprising a second gear ring sized and shaped to fit about a respective correction collar of a second objective lens, wherein the adjustment mechanism is further configured to selectively engage and cause movement of the first gear ring or the second gear ring.

11. The system of claim 1, further comprising:
a magnet affixed to the correction collar; and
a hall effect sensor untethered from the gear ring and the objective lens, wherein the magnet and the hall effect sensor contribute to determining a home position of the system.

12. The system of claim 1, wherein the gear ring comprises a window extending about a portion of a perimeter of the gear ring, wherein the window is configured to expose a scale of the objective lens.

13. An imaging system, comprising:
a system for selectively adjusting an objective lens, the system comprising:
a gear ring sized and shaped to fit about a correction collar of an objective lens; and
an adjustment mechanism comprising a motor operably connected to a complementary gear configured to selectively engage and cause movement of the gear ring, thereby adjusting the correction collar;
an aberration detection component, wherein the aberration detection component is communicatively coupled to a computer system comprising one or more processors and one or more hardware storage devices storing instructions that are executable by the one or more processors to configure the computer system to:
receive data from the aberration detection component defining one or more aspects of an aberration;
calculate a correction collar adjustment that mitigates the aberration when implemented at the correction collar; and
cause the controller to automatically implement the correction collar adjustment; and
a controller for operating the adjustment mechanism.

14. The imaging system of claim 13, wherein the adjustment mechanism is positioned adjacent to an optical axis of the imaging system.

15. A method for motorized adjustment of an objective lens correction collar, comprising:
positioning an objective lens translation device at a first position, the objective lens translation device comprising an objective lens having a correction collar fitted with a gear ring;
engaging a z drive to move the objective lens across a z-distance to a correction collar adjustment position, wherein the gear ring associates with a complementary gear of an adjustment mechanism at the correction collar adjustment position; and
engaging a motor of the adjustment mechanism to adjust the correction collar.

16. The method of claim 15, wherein engaging the motor causes movement of the complementary gear, and wherein movement of the complementary gear is translated to the gear ring fitted about the correction collar.

17. The method of claim 15, further comprising identifying a type of the objective lens having the correction collar, wherein the z-distance between the first position and the correction collar adjustment position is based on the type of the objective lens.

* * * * *